United States Patent
Frait et al.

(10) Patent No.: US 9,180,766 B2
(45) Date of Patent: Nov. 10, 2015

(54) FRONT MODULE FOR A MODULAR HYBRID TRANSMISSION AND A METHOD FOR CONNECTING/DISCONNECTING THE FRONT MODULE FROM A TORQUE CONVERTER

(71) Applicant: Ford Global Technologies, LLC, Dearborn, MI (US)

(72) Inventors: Steven Anatole Frait, Milan, MI (US); John Edward Brevick, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 184 days.

(21) Appl. No.: 14/107,485

(22) Filed: Dec. 16, 2013

(65) Prior Publication Data
US 2015/0166049 A1 Jun. 18, 2015

(51) Int. Cl.
*B60K 6/387* (2007.10)
*B60K 6/48* (2007.10)
*F16H 41/24* (2006.01)

(52) U.S. Cl.
CPC . *B60K 6/387* (2013.01); *B60K 6/48* (2013.01); *F16H 41/24* (2013.01); *B60Y 2304/074* (2013.01); *B60Y 2400/426* (2013.01); *Y10S 903/902* (2013.01)

(58) Field of Classification Search
CPC ... B60W 20/40; B60W 10/02; B60W 10/023; B60W 10/06; B60W 10/08; B60K 6/387; B60K 6/40; B60K 6/405; B60K 6/42; B60K 6/44; B60K 6/46; B60K 6/48; F16H 41/24; F16H 47/06; Y10S 903/902; Y10S 903/952; B60Y 2400/426; B60Y 2304/074
See application file for complete search history.

(56) References Cited

U.S. PATENT DOCUMENTS

| 4,535,655 A | 8/1985 | Avery |
| 5,018,414 A | 5/1991 | Naumann |
| 2013/0192949 A1* | 8/2013 | Frait et al. ............... 192/85.63 |
| 2015/0114780 A1* | 4/2015 | Frait et al. ............... 192/3.25 |

FOREIGN PATENT DOCUMENTS

JP 2006137406 A 6/2006

* cited by examiner

*Primary Examiner* — Jacob S Scott
(74) *Attorney, Agent, or Firm* — David B. Kelley; Brooks Kushman P.C.

(57) ABSTRACT

A front module disposed between an engine and a torque converter, and a method for coupling or decoupling the front module to the torque converter is provided. The front module has a housing that defines a cavity and has at least one access window, but preferably two access windows. The access windows may each include a notch. Disposed in the housing of the front module is a motor/generator and an engine disconnect clutch. A flexplate connects an output of the front module to the torque converter. The flexplate has a plurality of notches located on a periphery of the flexplate, and the flexplate is connected to the torque converter by a plurality of fasteners. Both the notches on the periphery of the flexplate and the plurality of fasteners are accessible through the access windows.

20 Claims, 4 Drawing Sheets

FRONT MODULE FOR A MODULAR HYBRID TRANSMISSION AND A METHOD FOR CONNECTING/DISCONNECTING THE FRONT MODULE FROM A TORQUE CONVERTER

TECHNICAL FIELD

The present disclosure relates to a front module for a modular hybrid transmission and a method for connecting or disconnecting the front module from a torque converter.

BACKGROUND

Modular hybrid transmissions are designed such that the transmission gearbox and torque converter (or launch clutch if there is no torque converter) are mostly carryover from a non-hybrid application. A separate assembly housing an engine disconnect clutch and a motor/generator is bolted between an engine and a transmission housing. The assembly housing the engine disconnect clutch and motor/generator may generally be referred to as the front module.

In a non-hybrid application that connects an engine output to a torque converter via a flexplate, the bolts connecting the torque converter to the flexplate are easily accessible through indentations on both sides of the engine, one of the indentations being the starter motor pocket. Also in the non-hybrid application, rotation of the torque converter is easily accomplished by rotating the starter ring gear. Having the ability to rotate the torque converter when connecting/disconnecting the flexplate allows the torque converter and flexplate to be indexed so that each bolt connecting the torque converter to the flexplate may be accessible through one of the indentations on either side of the engine at a given rotated position.

In a modular hybrid transmission application where the output of a motor/generator connects to a torque converter via a flexplate, the front module that is disposed between the engine and torque converter has a housing that does not have indentations for access to the bolts that connect the torque converter to the flexplate. In addition, neither the flexplate nor torque converter has features that are accessible to allow rotation of the torque converter.

It would be desirable to provide a modular hybrid transmission application where the bolts connecting an output of a motor/generator to a torque converter via a flexplate are accessible. It would also be desirable to provide a modular hybrid transmission application where the torque converter and flexplate may be indexed so that each bolt connecting the flexplate to the torque converter may be accessible at a given rotated position.

SUMMARY

In one aspect of the disclosure, a front module disposed between an engine and a torque converter is provided. The front module has a housing that defines a cavity and has at least one access window. The access window(s) may include a notch. Disposed in the housing of the front module is a motor/generator and an engine disconnect clutch. A flexplate connects an output of the front module to the torque converter. The flexplate has a plurality of notches located on a periphery of the flexplate, and the flexplate is connected to the torque converter by a plurality of fasteners. Both the notches on the periphery of the flexplate and the plurality of fasteners are accessible through the access windows.

In another aspect of the disclosure, a method for coupling or decoupling a front module to a torque converter is provided. The front module has a housing that defines a cavity and has at least one access window. The access window(s) may include a notch. Disposed in the housing of the front module is a motor/generator and an engine disconnect clutch. A front module input is rotatably fixed to a front module output when the engine disconnect clutch is closed. A flexplate is provided that has an inner portion that is rotatably fixed to the front module output, and an outer portion that is rotatably fixed to the torque converter by a plurality of fasteners. The outer portion of the flexplate is accessible through the at least one access window. The steps of the method include: closing the engine disconnect clutch; indexing the flexplate to the first of a plurality of positions by rotating the front module input; rotatably fixing or unfixing the outer portion of the flexplate, through the access window, to the torque converter with one of the plurality of fasteners; indexing the flexplate and torque converter to the remaining plurality of positions by rotating the front module input; and rotatably fixing or unfixing the outer portion of the flexplate, through the access window, to the torque converter at each of the remaining plurality of positions with the remaining plurality of fasteners.

In yet another aspect of the disclosure, a method for coupling or decoupling a front module to a torque converter is provided. The front module has a housing that defines a cavity and has at least one access window. The access window(s) may include a notch. Disposed in the housing of the front module is a motor/generator and an engine disconnect clutch. A front module input is rotatably fixed to a front module output when the engine disconnect clutch is closed. A flexplate is provided that has an inner portion that is rotatably fixed to the front module output, an outer portion that is rotatably fixed to the torque converter by a plurality of fasteners, and a periphery that defines a plurality of notches. The outer portion of the flexplate and the plurality of notches are accessible through the at least one access window. A tool is provided that cooperates with the housing of the front module and plurality of notches on the flexplate, so that the flexplate can be rotated to position each of the plurality of fasteners in turn within the at least one access window. The steps of the method include: opening the engine disconnect clutch, so that the front module output is not rotatably fixed to the front module input; inserting the tool into the plurality of notches through the at least one access window (the tool may also be inserted into the notch in the at least one access window); indexing the flexplate to the first of a plurality of positions by rotating flexplate with the tool; rotatably fixing or unfixing the outer portion of the flexplate, through the at least one access window, to the torque converter with one of the plurality of fasteners; inserting the tool into the plurality of notches through the at least one access window (the tool may also be inserted into the notch in the at least one access window); indexing the flexplate and torque converter to the remaining plurality of positions with the tool; and rotatably fixing or unfixing the outer portion of the flexplate, through the at least one access window, to the torque converter at each of the remaining plurality of positions with the remaining plurality of fasteners.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
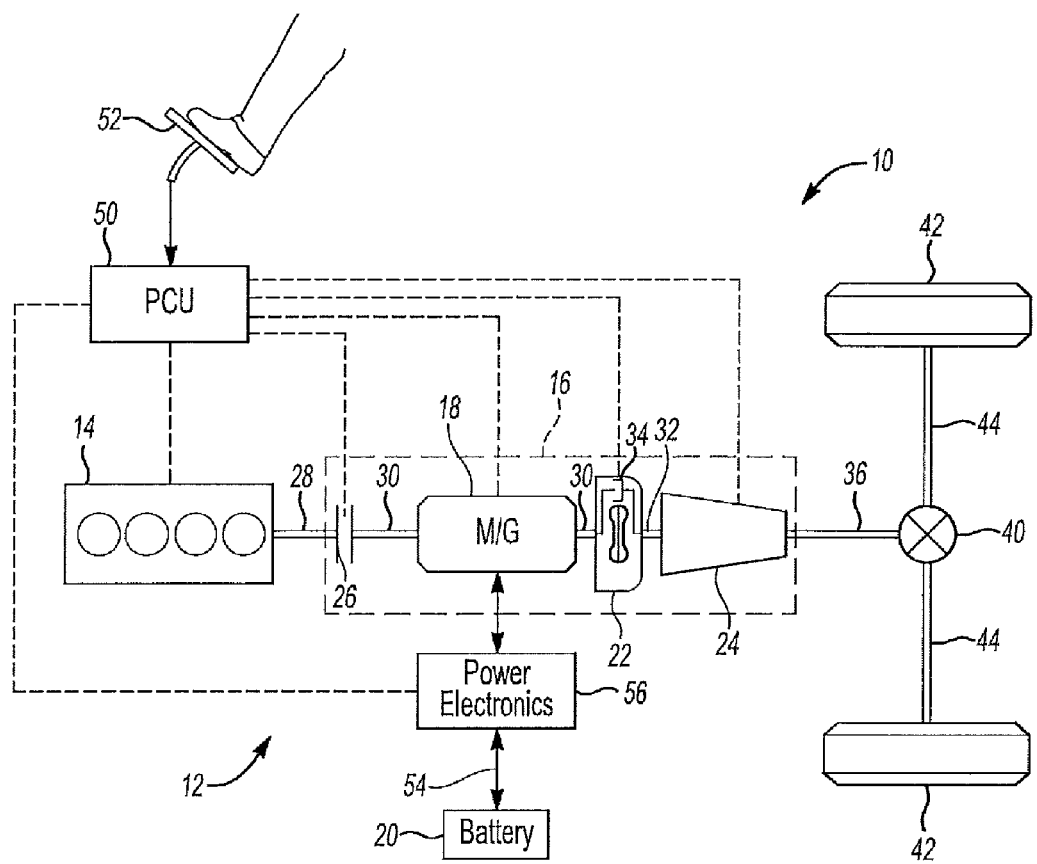
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when an engine disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the engine disconnect clutch 26 is at least partially engaged, power flow from the engine 14 to the M/G 18 or from the M/G 18 to the engine 14 is possible. For example, the engine disconnect clutch 26 may be engaged and M/G 18 may operate as a generator to convert rotational energy provided by a crankshaft 28 and M/G shaft 30 into electrical energy to be stored in the battery 20. The engine disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the engine disconnect clutch 26 is at least partially engaged.

The M/G 18 is connected to the torque converter 22 via shaft 30. The torque converter 22 is therefore connected to the engine 14 when the engine disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to the engine disconnect clutch 26 may be provided between the M/G 18 and gearbox 24 for applications that do not include a torque converter 22 or a torque converter bypass clutch 34. In some applications, the engine disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, engine disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for the engine disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the engine disconnect clutch 26 and the torque converter bypass clutch 34. Like the engine disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the engine disconnect clutch 26 is at least partially engaged to transfer at least a portion of the engine torque through the engine disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the engine disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the vehicle 10 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit torque through the transmission. For example, the M/G 18 may be offset from the crankshaft 28 or an additional motor may be provided to start the engine 14. Other configurations are contemplated without deviating from the scope of the present disclosure.

Figure 2:
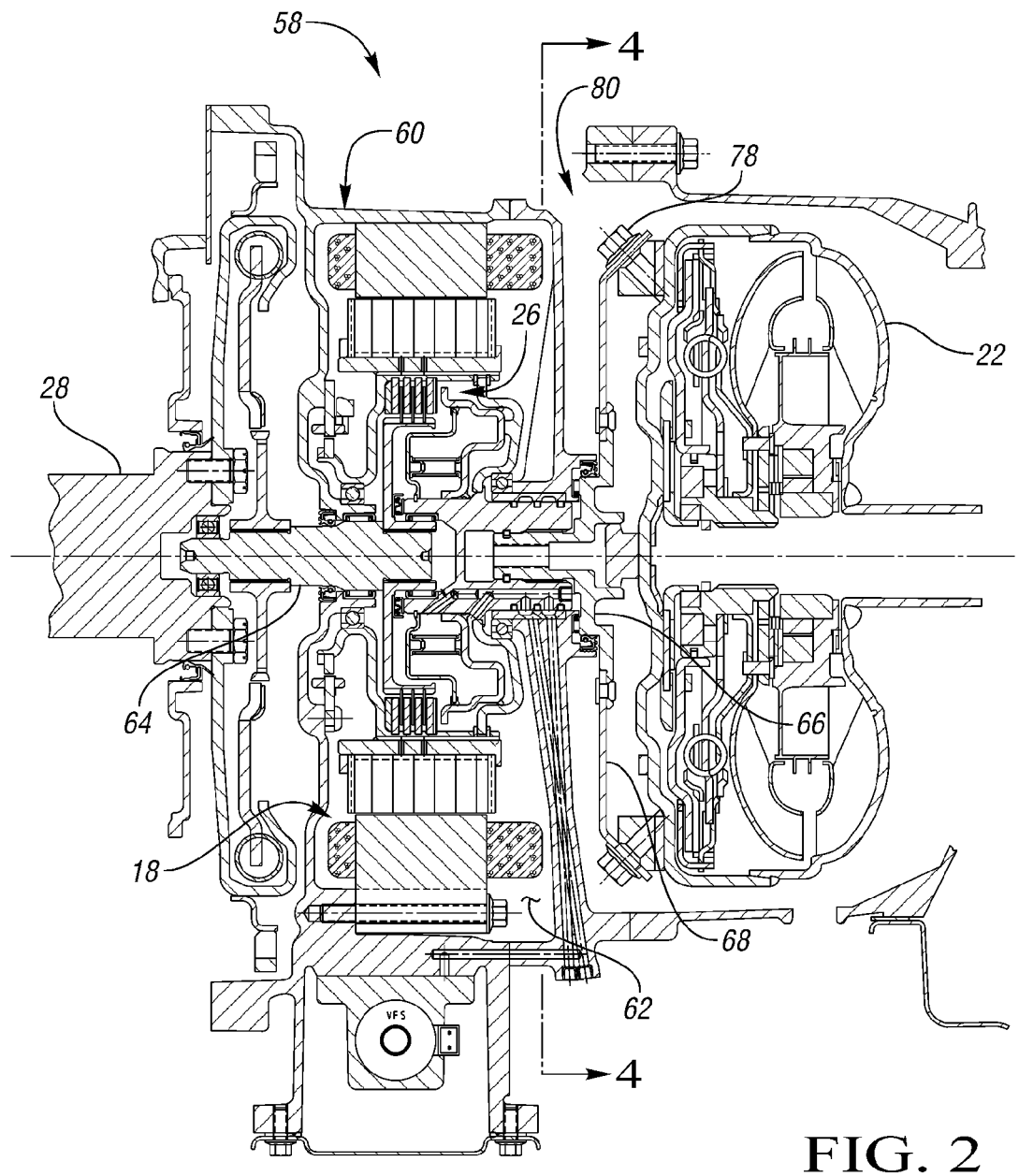
FIG. 2 is a cross-sectional side view of a front module and torque converter.

Referring to FIG. 2, a cross sectional view of a front module 58 disposed between the engine 14 (not shown) and the torque converter 22 illustrated. The front module 58 has a housing 60 that defines a cavity 62. Disposed in the cavity 62 of the housing 60 are the M/G 18 and the engine disconnect clutch 26. A front module input 64 is rotatably fixed to an output of the engine 14 (the output of the engine 14 typically being the crankshaft 28). A front module output 66 is rotatably fixed to the torque converter 22 by way of a flexplate 68. The front module output 66 and front module input 64 are rotatably fixed together when the engine disconnect clutch 26 is in a closed position. When the engine disconnect clutch is in an open position, the front module output 66 and front module input 64 are not rotatably fixed together.

Figure 3:
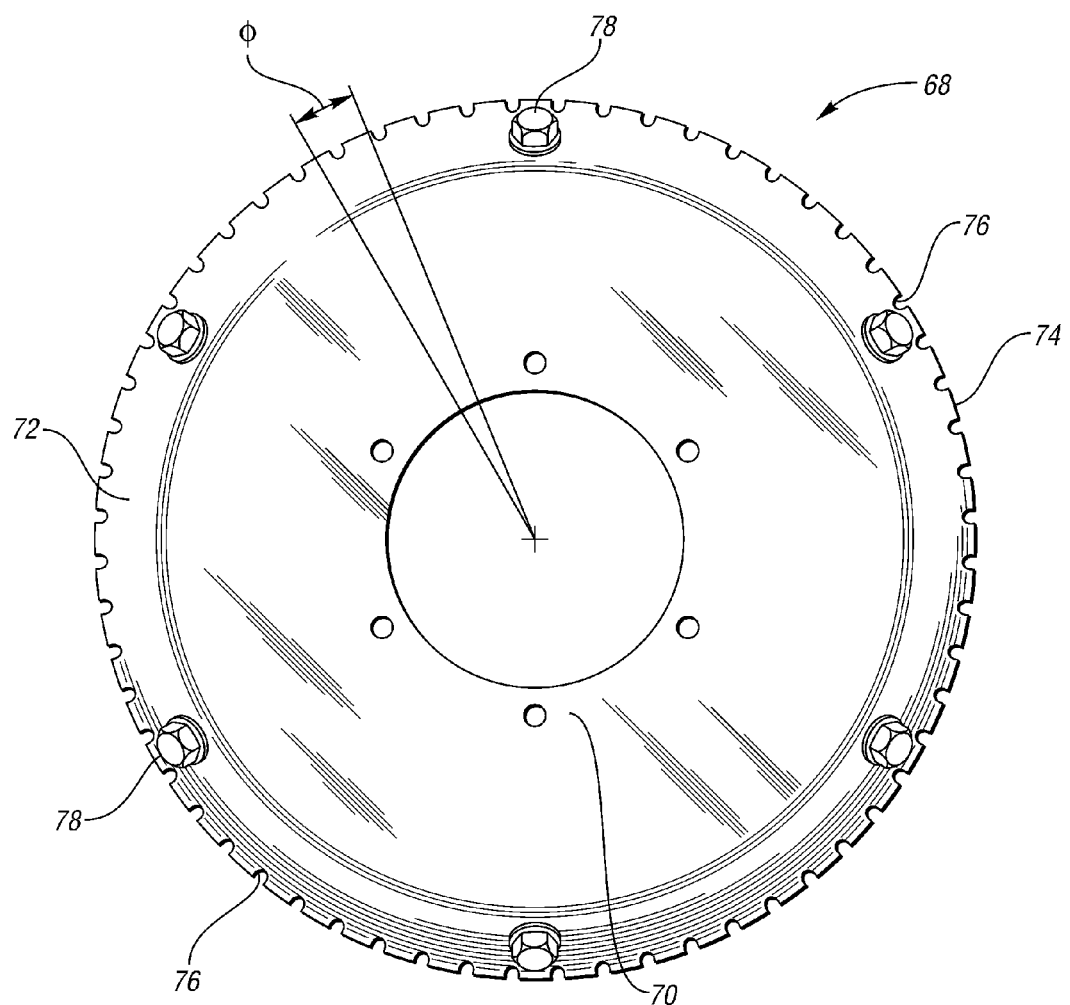
FIG. 3 is a plan view of the flexplate.

Referring to FIG. 3, the flexplate 68 has an inner portion 70, and outer portion 72, and a periphery 74, the periphery defining a plurality of notches 76. The flexplate 68 is rotatably fixed to the front module output 66 at the inner portion 70, and is also rotatably fixed to the torque converter 22 at the outer portion 72. A plurality of fasteners 78 is used to rotatably fix the flexplate 68 to the torque converter 22. The plurality of notches 76 defined by the periphery 74 of the flexplate 68 may be spaced at intervals of equal distance. Preferably, the angular spacing (represented by the symbol Φ in FIG. 3) between each notch in the plurality of notches 76, ranges from 5° to 20° on the periphery 74 of the flexplate 68.

Figure 4:
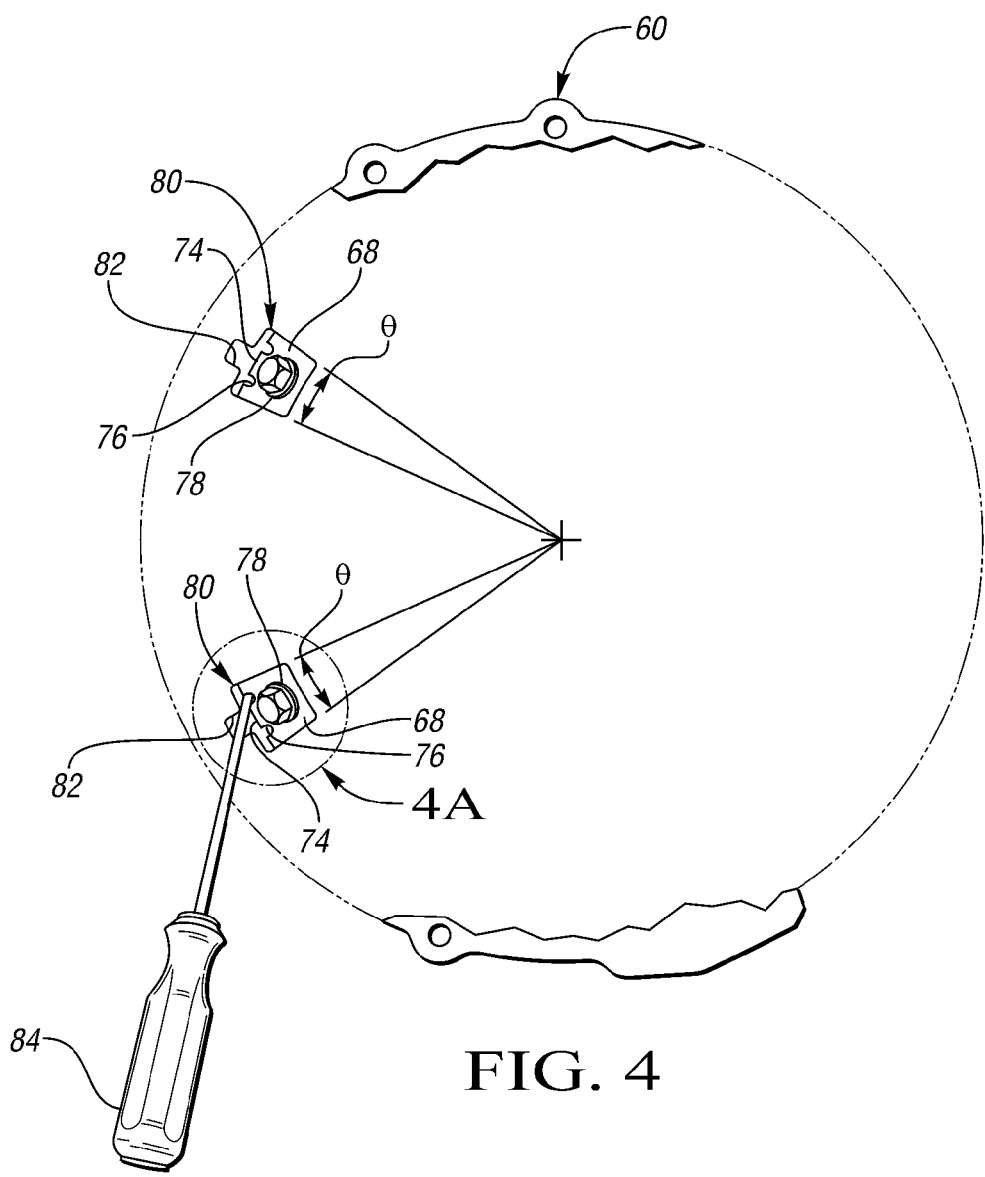
FIG. 4 is a cross-sectional view of the front module taken along the line 4-4 of FIG. 2 illustrating two access windows.
Figure 4A:
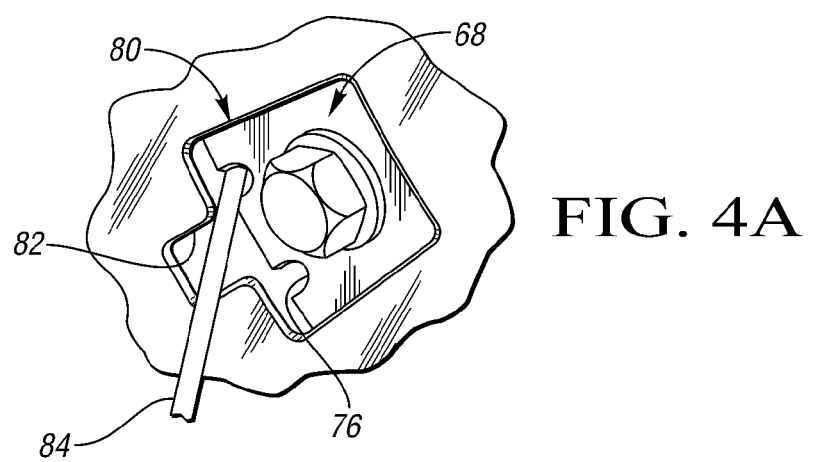
FIG. 4A is an enlarged sectional view of the access window shown in circle 4A of FIG. 4.

Illustrated in FIGS. 2, 4, and 4A, the housing 60 of the front module 58 includes at least one, but preferably two, access windows 80. Each access window 80 may also include a notch 82. The plurality of notches 76 defined by the periphery 74 of the flexplate 68 may be accessible through any of the at least one, but preferably two, access windows 80, and the plurality of fasteners 78 may also be accessible through any of the at least one, but preferably two, access windows 80. Preferably, the access provided by the access windows 80 ranges from 5° to 30° on the periphery 74 of the flexplate 68. This range of access on the periphery 74 of the flexplate 68 is represented by the symbol θ in FIG. 4.

The front module 58 may be coupled or decoupled from the torque converter 22 by: closing the engine disconnect clutch 26, so that the front module output 66 is rotatably fixed to the front module input 64; indexing the flexplate 68 to the first of a plurality of positions by rotating the front module input 64; rotatably fixing or unfixing the outer portion 72 of the flexplate 68, through the at least one access window 80, to the torque converter 22 with one of the plurality of fasteners 78; indexing the flexplate 68 and torque converter 22 to the remaining plurality of positions by rotating the front module input 64; and rotatably fixing or unfixing the outer portion 72 of the flexplate 68, through the at least one access window 80, to the torque converter 22 at each of the remaining plurality of positions with the remaining plurality of fasteners 78.

The front module 58 may also be coupled or decoupled from the torque converter 22 by: providing a tool 84, such as a pry bar or flat head screw driver (illustrated in FIGS. 4 and 4a), that cooperates with the housing 60 of the front module 58 and plurality of notches 76 defined by the periphery 74 of the flexplate 68, so that the flexplate 68 can be rotated to position the plurality of fasteners 78 within the at least one access window 80; opening the engine disconnect clutch 26, so that the front module output 66 is not rotatably fixed to the front module input 64; inserting the tool 84 into the plurality of notches 76 defined by the periphery 74 of the flexplate 68 through the at least one access window 80, preferably through the notch 82 included in the at least one access window 80; indexing the flexplate 68 to the first of a plurality of positions by rotating flexplate 68 with the tool 84; rotatably fixing or unfixing the outer portion 72 of the flexplate 68, through the at least one access window 80, to the torque converter 22 with one of the plurality of fasteners 78; inserting the tool 84 into the plurality of notches 76 defined by the periphery 74 of the flexplate 68 through the at least one access window 80, preferably through the notch 82 included in the at least one access window 80; indexing the flexplate 68 and torque converter 22 to the remaining plurality of positions with the tool 84; and rotatably fixing or unfixing the outer portion 72 of the flexplate 68, through the at least one access window 80, to the torque converter 22 at each of the remaining plurality of positions with the remaining plurality of fasteners 78.

The at least one access window 80 should be large enough to compensate for any cogging (jumping in radial position that occurs in electric motors because of magnetic polarity differences in some portions of the stator relative to some portions of the rotor) that may occur when the M/G 18 is being rotated to each of the plurality of positions.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid vehicle front module disposed between an engine and a torque converter comprising:
    a housing defining a cavity and a first access window, the housing having a motor/generator and an engine disconnect clutch disposed therein; and
    a flexplate that connects an output of the front module to the torque converter, the flexplate having a periphery that defines a plurality of notches, wherein the plurality of notches is accessible through the first access window.

2. The front module of claim 1, wherein the first access window includes a first notch.

3. The front module of claim 1, wherein the accessibility to the plurality of notches through the first access window ranges between 5° and 30° on the periphery of the flexplate.

4. The front module of claim 1, wherein the flexplate is fixed to the torque converter by a plurality of fasteners.

5. The front module of claim 4, wherein the plurality of fasteners is accessible through the first access window.

6. The front module of claim 5, wherein the accessibility to the plurality of fasteners through the first access window ranges between 5° and 30° on the periphery of the flexplate.

7. The front module of claim 4, wherein the housing defines a second access window.

8. The front module of claim 7, wherein the second access window includes a second notch.

9. The front module of claim 7, wherein the plurality of fasteners is accessible through the second access window.

10. The front module of claim 8, wherein the accessibility to the plurality of fasteners through the second access window ranges between 5° and 30° on the periphery of the flexplate.

11. The front module of claim 7, wherein the plurality of notches is accessible through the second access window.

12. The front module of claim 11, wherein the accessibility to the plurality of notches through the second access window ranges between 5° and 30° on the periphery of the flexplate.

13. The front module of claim 1, wherein the flexplate defines the plurality of notches at intervals of equal distance.

14. The front module of claim 13, wherein the flexplate defines the plurality of notches at intervals of equal distance that range between 5° and 20° on the periphery of the flexplate.

15. A method for coupling or decoupling a front module to a torque converter, the front module having a housing defining a cavity and an access window, the housing having a motor/generator and an engine disconnect clutch disposed therein, a front module input, a front module output rotatably fixed to the front module input when the engine disconnect clutch is closed, and a flexplate having an inner portion and an outer portion, the flexplate rotatably fixed to the front module output at the inner portion, wherein the outer portion of the flexplate is accessible through the access window, the method comprising:
    closing the engine disconnect clutch;
    indexing the flexplate to the first of a plurality of positions by rotating the front module input;
    rotatably fixing or unfixing the outer portion of the flexplate, through the access window, to the torque converter with a fastener;
    indexing the flexplate and torque converter to the remaining plurality of positions by rotating the front module input; and
    rotatably fixing or unfixing the outer portion of the flexplate, through the access window, to the torque converter at each of the remaining plurality of positions with a corresponding fastener.

16. A method for coupling or decoupling a front module to a torque converter, the front module including a housing defining a cavity and at least at one access window, the housing having a motor/generator and an engine disconnect clutch disposed therein, a front module input, a front module output coupled with the front module input when the engine disconnect clutch is closed, and a flexplate having an inner portion, an outer portion, and a periphery that defines a plurality of notches, wherein the flexplate is removably fixed to the front module output at the inner portion, a portion of the outer portion of the flexplate is accessible through the at least one access window, and at least some of the plurality of notches are accessible through the at least one access window, the method comprising:
    opening the engine disconnect clutch so that the front module output is rotatable relative to the front module input;
    inserting a tool that cooperates with the housing of the front module and the notches on the flexplate accessible through the at least one access window;
    indexing the flexplate using the tool to a first position;
    fixing or unfixing the outer portion of the flexplate to the torque converter using a fastener through the at least one access window;
    indexing the flexplate and torque converter using the tool to a next position; and
    fixing or unfixing the outer portion of the flexplate to the torque converter through the at least one access window using a fastener.

17. The method of claim 16, wherein the at least one access window of the front module further comprises at least one notch, and the tool is inserted into notches in the flexplate through the at least one notch of the at least one access window.

18. The method of claim 16, wherein the at least one access window comprises a first access window and a second access window.

19. The method of claim 18, wherein the tool is inserted into the first access window.

20. The method of claim 18, wherein the outer portion of the flexplate is rotatably fixed or unfixed, through the second access window, to the torque converter.

* * * * *